United States Patent [19]

Anzai et al.

[11] Patent Number: 5,162,942
[45] Date of Patent: Nov. 10, 1992

[54] LENS CAP APPLICABLE TO A VIDEO CAMERA

[75] Inventors: Tsutomu Anzai; Akira Isobe, both of Tokyo, Japan

[73] Assignee: Sony Corporation, Tokyo, Japan

[21] Appl. No.: 223,418

[22] Filed: Jul. 22, 1988

[30] Foreign Application Priority Data

Aug. 6, 1987 [JP] Japan .................. 62-197210

[51] Int. Cl.$^5$ .................. G02B 23/16; B65D 51/24
[52] U.S. Cl. .................. 350/587; 213/230; 213/87; 261/226
[58] Field of Search .................. 350/587; 358/225; 213/230, 227, 228, 87; 261/226

[56] References Cited

U.S. PATENT DOCUMENTS

| | | | |
|---|---|---|---|
| 2,168,594 | 8/1939 | Von Till | 215/230 |
| 2,583,228 | 1/1952 | Numbers | 350/587 |
| 2,961,108 | 11/1960 | Johnson | 215/228 |
| 3,133,140 | 5/1964 | Winchell | 350/587 |
| 3,682,055 | 8/1972 | Okano et al. | |
| 3,768,688 | 10/1973 | Linke | 215/227 |
| 3,796,477 | 3/1974 | Geraci | 350/587 |
| 4,603,785 | 8/1986 | Gach | 215/230 |

FOREIGN PATENT DOCUMENTS

| | | |
|---|---|---|
| 4414885 | 1/1986 | Australia . |
| 0083430 | 7/1983 | European Pat. Off. . |
| 0097064 | 12/1983 | European Pat. Off. . |
| 939192 | 2/1956 | Fed. Rep. of Germany ...... 350/587 |
| 2208526 | 8/1973 | Fed. Rep. of Germany . |
| 7110736 | 2/1972 | Netherlands .................. 350/587 |

OTHER PUBLICATIONS

Patent Abstracts of Japan, vol. 11, No. 110 (E–496) [2557], Apr. 7, 1987; & JP-A-61 257 083 (Matsushita Electric Ind. Co. Ltd) Nov. 4, 1986.
Patent Abstracts of Japan, vol. 9, No. 248 (E–347) [2/1971], Oct. 4, 1985; & JP-A-60 096 967 (Asahi Kougaku Kogyo K.K.) May 30, 1985.

*Primary Examiner*—Jon W. Henry
*Attorney, Agent, or Firm*—Ronald P. Kananen

[57] ABSTRACT

A lens cap for a title for removably covering a photograph lens of a video camera which is capable of photographing an object at a very short distance to carry out title photographing is disclosed in which a part of the lens cap is provided with a region capable of removably attaching a title element such as a title recording paper thereto. Therefore, the title photographing in such as a macro mode with the above-described video camera can be achieved with the lens cap attached onto an exposed tip portion of the photograph lens.

20 Claims, 7 Drawing Sheets

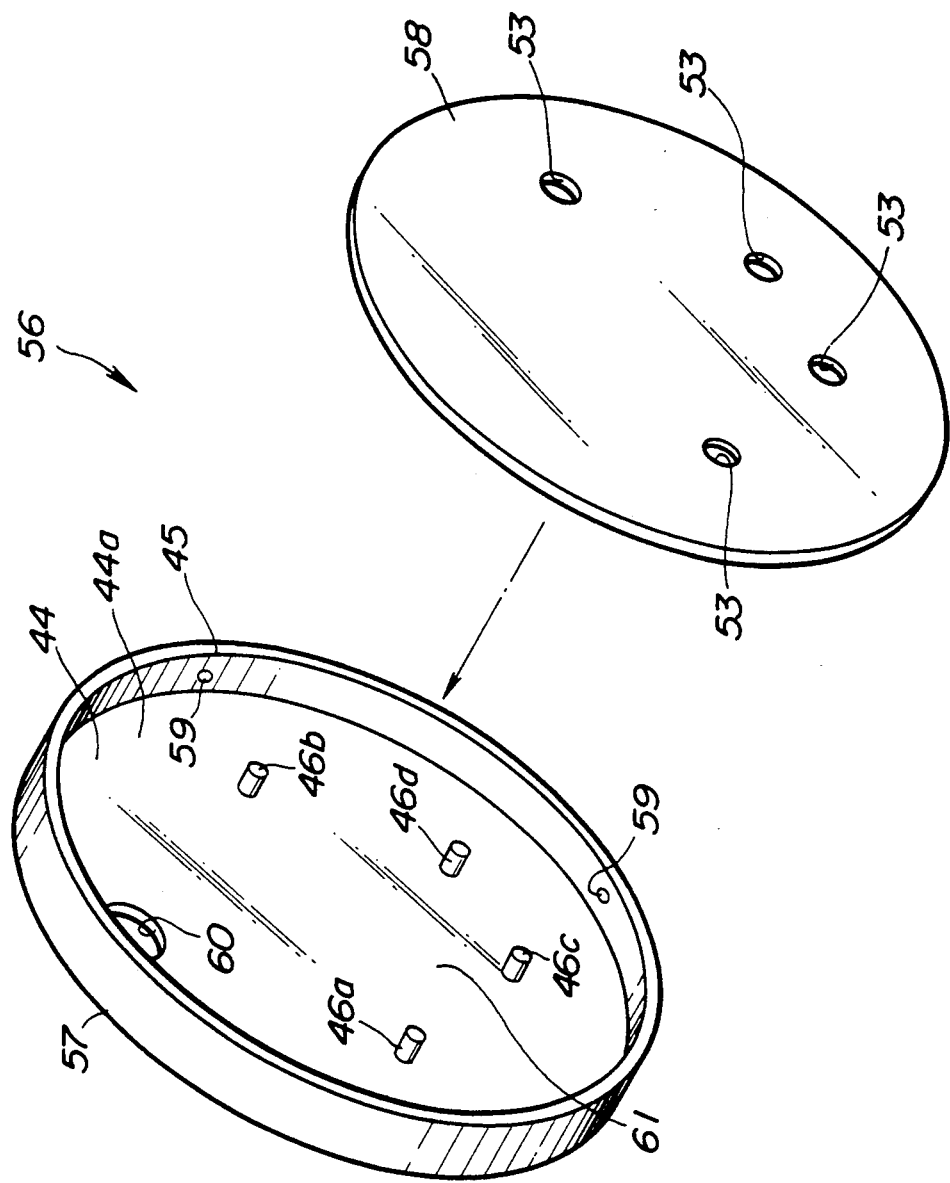

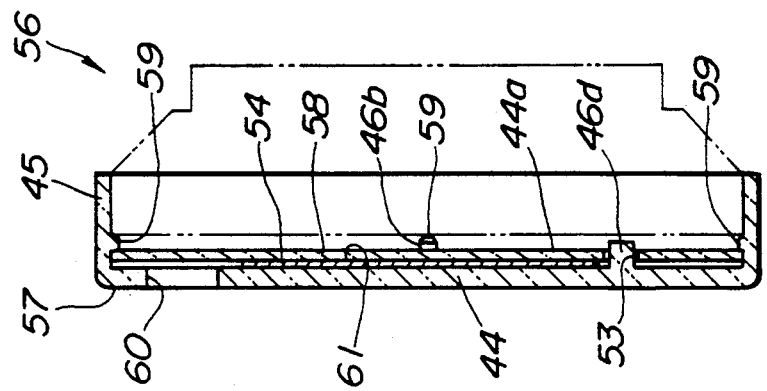
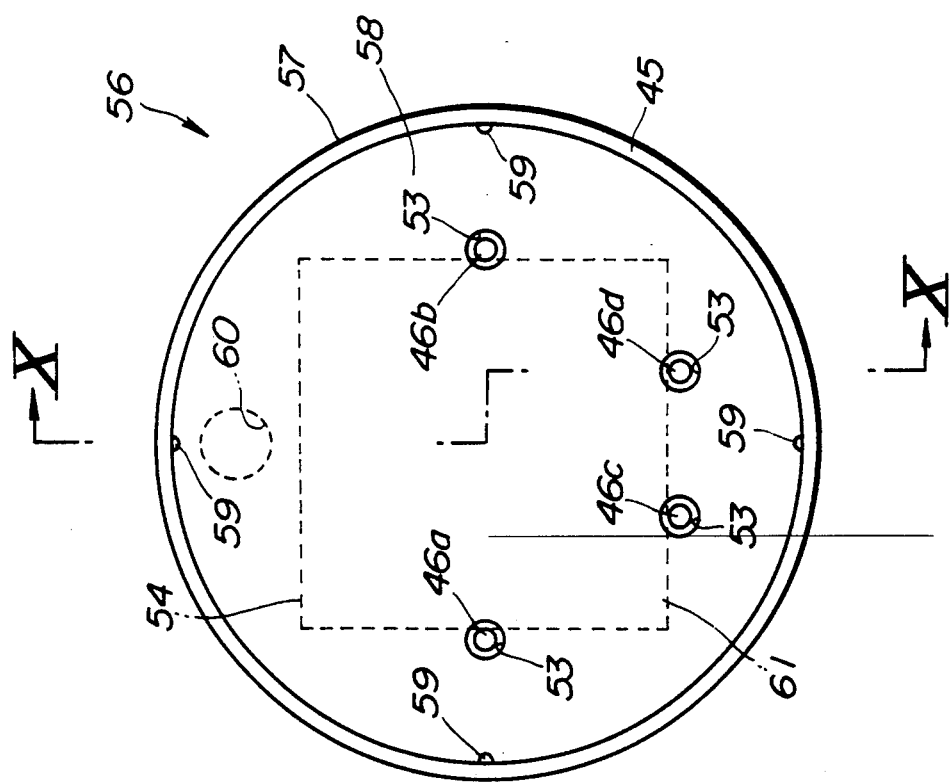

LENS CAP APPLICABLE TO A VIDEO CAMERA

BACKGROUND OF THE INVENTION (1) Field of the Invention

The present invention generally relates to a lens cap applicable to a video camera. Specifically, the present invention relates to the lens cap which is removably attached to a lens of a video camera and convenient for photographing a title according to its convenient for photographing a title. More specifically, the present invention relates to a lens cap removably covering a photograph lens such as a zoom lens or an exchange macro lens which is capable of photographing an object at a close distance, e.g., capable of macrophotographing (photographing the object in a macro mode) and capable of photographing the title or titled objects on which the title is written extremely easily without fluctuations of the camera body and/or photographed objects on an image through a displayed screen.

(2) Background of the Art

Tape editing is often carried out such that a part of the images photographed by means of a video camera is deleted or an image recorded on another magnetic tape is inserted between intermediate portions of the series of images. When such an editing operation as described above is carried out, an image constituted by the title characters making up the title, characters for a cut-in, or picture(s)(hereinafter referred to as a "title element") is inserted in the image (hereinafter referred to as a "title picture").

Recently, a video camera in which a so-called title superimpose function is provided has been developed.

Such a video camera as described above is provided with a memory for storing at least one still image photographed using a photograph lens and means for outputting the image stored in the memory to an image recording portion. Prior to the photographing, when a still title picture on which the title element written on a paper or the like is photographed, is stored in the memory, the title element can be superimposed and recorded on the image of the photographed object during the photographing.

There are several methods of photographing such a title as described above.

For example, with a paper on which the title element is written hung onto a wall or with the paper hung and supported on a person, the title element is photographed.

In addition, special auxiliary instruments used exclusively for photographing of the title element are provided on some video cameras.

The special auxiliary instrument includes an arm having a base end on which a screw is extended and a tip end from which an integrated supporting piece is vertically extended, and a screen frame on which the paper on which the title element is to be written (hereinafter referred to as a title recording paper) is removably attached. The title recording paper is located in front of the photograph lens when the mounting screw is threaded into a threaded hole for mounting three photographing legs (tripod) provided on the lower surface of a frame of the video camera and the title recording paper is mounted in the screen frame.

Although the photographing of the title is carried out in the way described above, a limited location for the title photographing and discreet and careful photographing are required to prevent a camera fluctuations or photographed object fluctuations on the image in a case where the title recording paper is photographed with the title recording paper hung on the wall.

In addition, when the photographing of the title is carried out using the special auxiliary instrument, a positional relationship between the title recording paper to be photographed and a video camera is fixed. Therefore, the fluctuations of the video camera and consequent fluctuations of the photographed object on the image do not occur. However, the cost of photographing the title becomes accordingly increased due to the installation of the special auxiliary instrument. A troublesome operation is needed to mount the special auxiliary instrument on the camera. In addition, when the title is photographed at an exterior photograph location, the special auxiliary instrument needs to be carried and to be mounted on the video camera. Therefore, the handling of such an auxiliary instrument is troublesome.

SUMMARY OF THE INVENTION

From among the photograph lenses, so called macro lens or zoom lens capable of carrying out the photographing of the object at a close distance is available on the market. In addition, many video cameras are provided with a zoom lens as a standard equipped lens or a special lens capable of photographing an object at a close distance is provided as an exchangeable lens. Such a macro lens or zoom lens can, in general, be focussed even if a photograph distance, i.e., a distance from the camera to the object being photographed is several centimeters or shorter.

With the above-described problems and matters in mind, it is an object of the present invention to provide a device for a title of a photograph which can removably be attached to a tip portion of a photograph lens capable of photographing an object at a close distance on which a region is provided at which an arbitary title element can removably be installed.

The above-described object can be achieved by providing a lens cap comprising: (a) a lens cap body capable of removably covering a tip portion of a photograph lens which is capable of photographing an object at a close distance., (b) a title element, and (c) a region of the lens cap body on which the title element is removably installed.

The above-described object can also be achieved by providing a device for a title applicable to comprising a video camera, (a) cap means for removably covering a tip portion of a photograph lens of the video camera which is capable of photographing an object in a macro mode.(b), a title member on which the title is written., and (c) holding means for supporting the title member on the cap means so as to be photographed by the video camera through the photograph lens.

BRIEF DESCRIPTION OF THE INVENTION

Figure 4A:
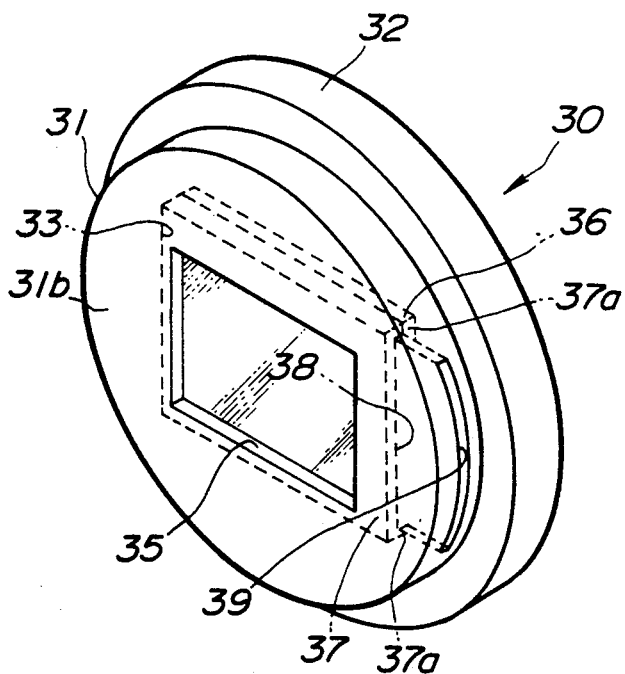
Figure 4B:
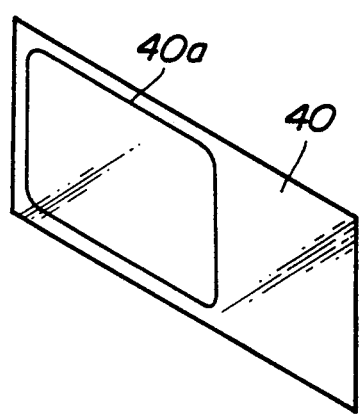

FIG. 4, through FIGS. 4A and 4B, is an enlarged perspective view representing the lens cap and title recording paper respectively.

Figure 5:
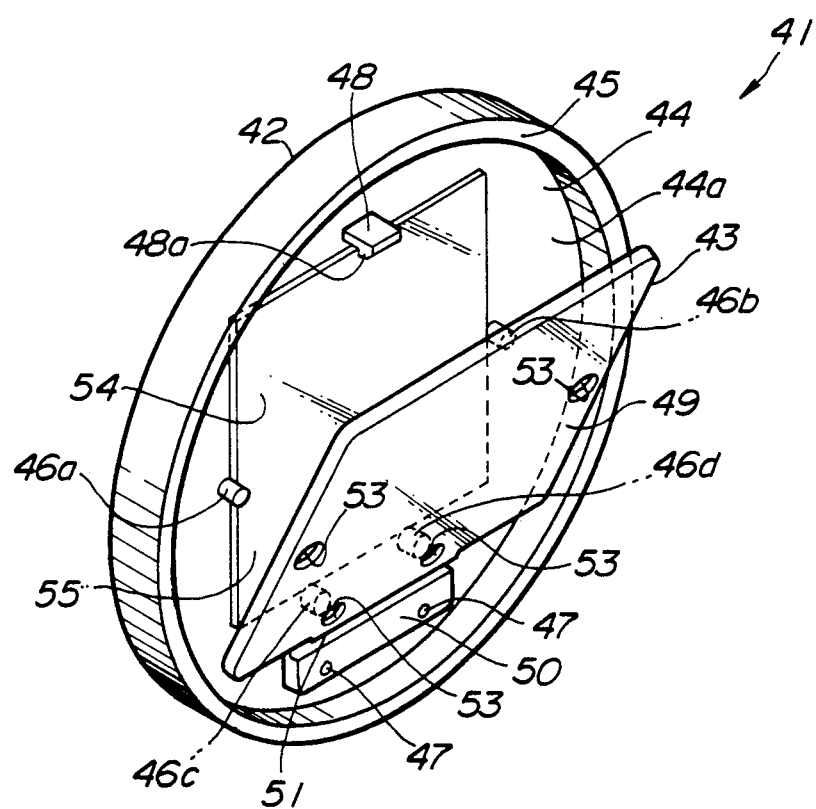

FIG. 5 is a perspective view of the lens cap in a second preferred embodiment according to the present invention.

Figure 6:
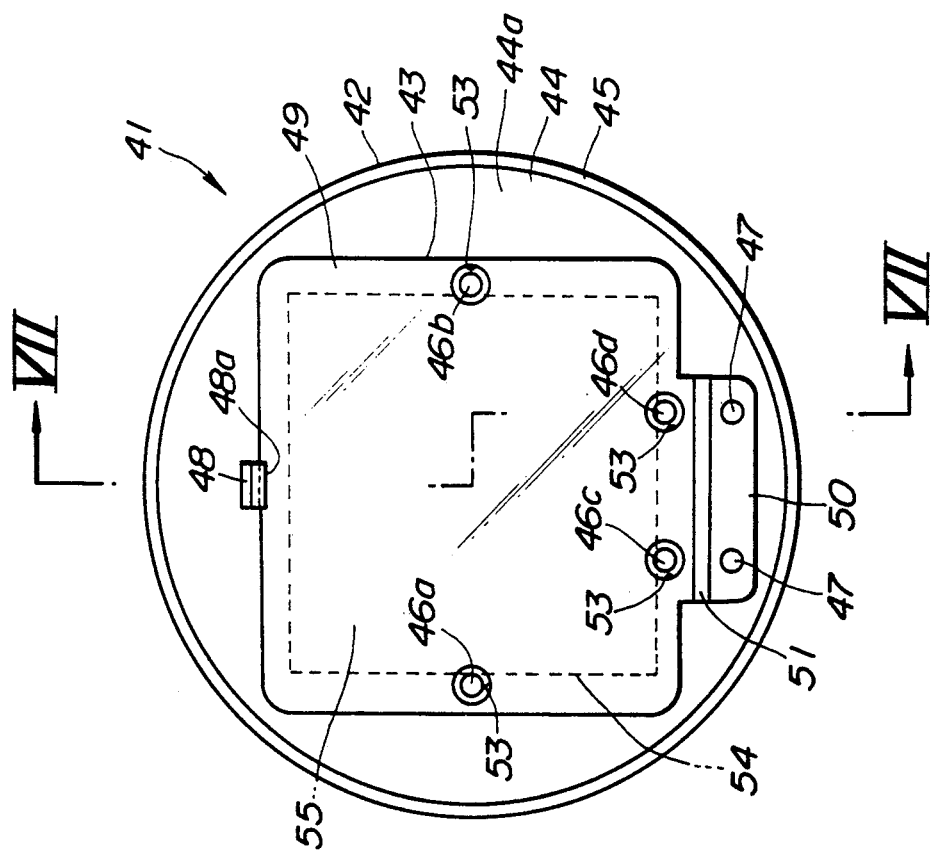

FIG. 6 is a rear view of the lens cap of the second preferred embodiment shown in FIG. 5.

Figure 7:
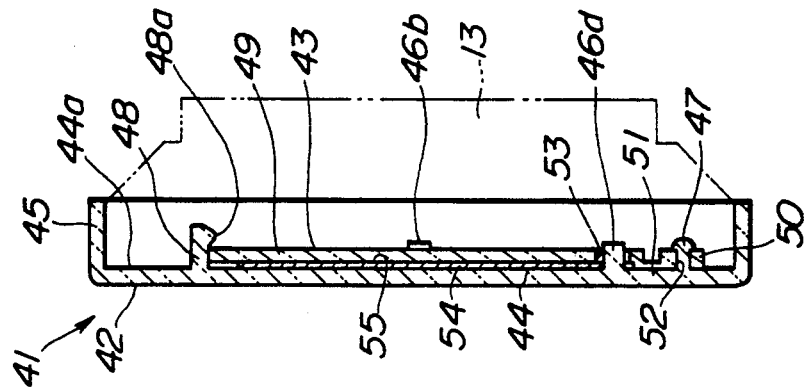

FIG. 7 is a cross sectional view of the lens cap cut away along the line VII—VII in FIG. 6.

FIG. 8 is an exploded perspective view of the lens cap in a third preferred embodiment according to the present invention.

FIG. 9 is a rear view of the lens cap in the third preferred embodiment shown in FIG. 8.

FIG. 10 is a cross sectional view of the lens cap cut away along the line X—X in FIG. 9.

DETAILED DESCRIPTION OF THE PREFERRED EMBODIMENTS

Reference will hereinafter will be made to the drawings in order to facilitate an understanding of the present invention.

FIRST PREFERRED EMBODIMENT

FIGS. 1 to 4 show a first preferred embodiment of a lens cap according to the present invention which is applicable to a video camera.

Figure 1:
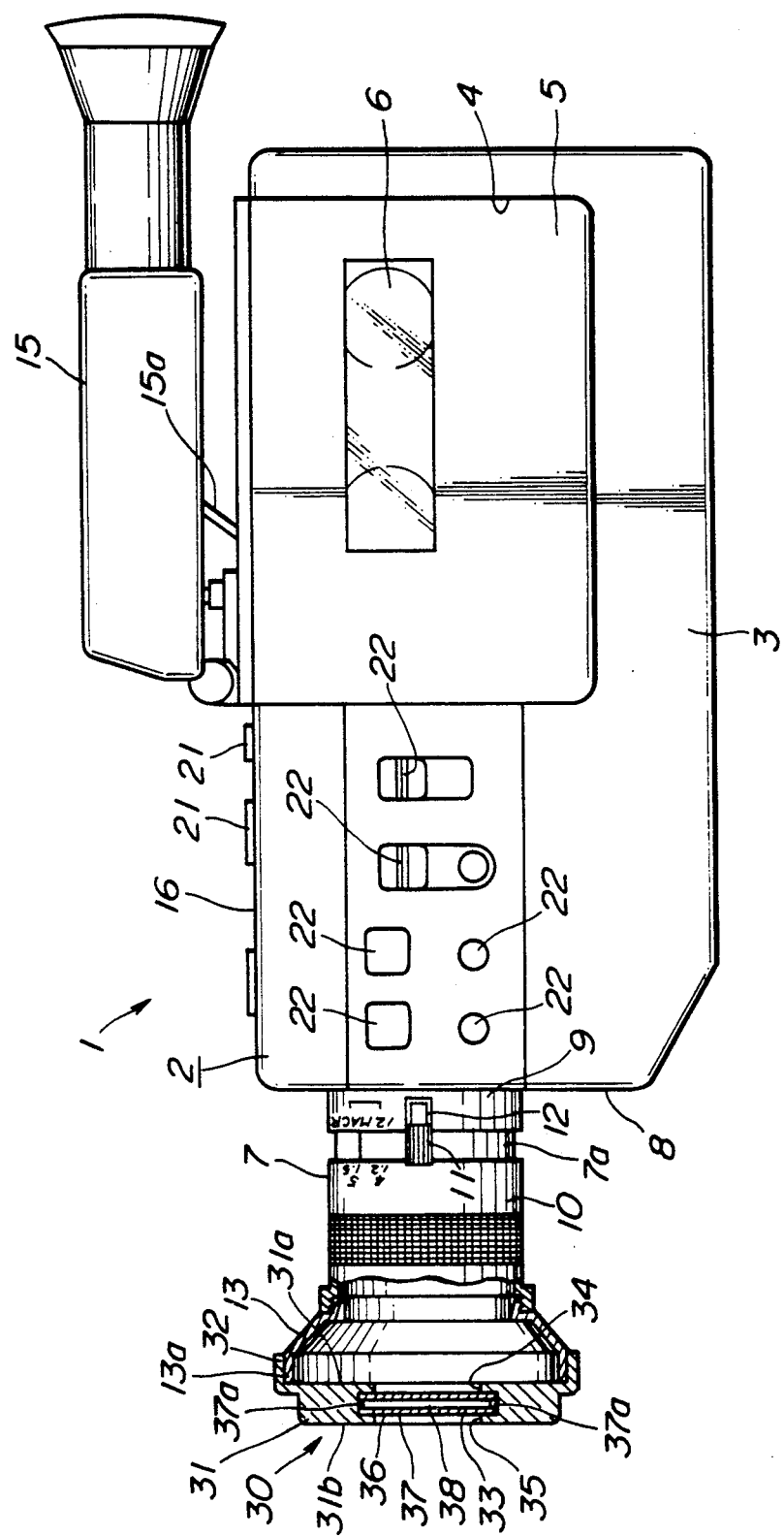
FIG. 1 is a partially cut way side view of a video camera to which a lens cap of a first preferred embodiment according to the present invention is applicable.
Figure 2:
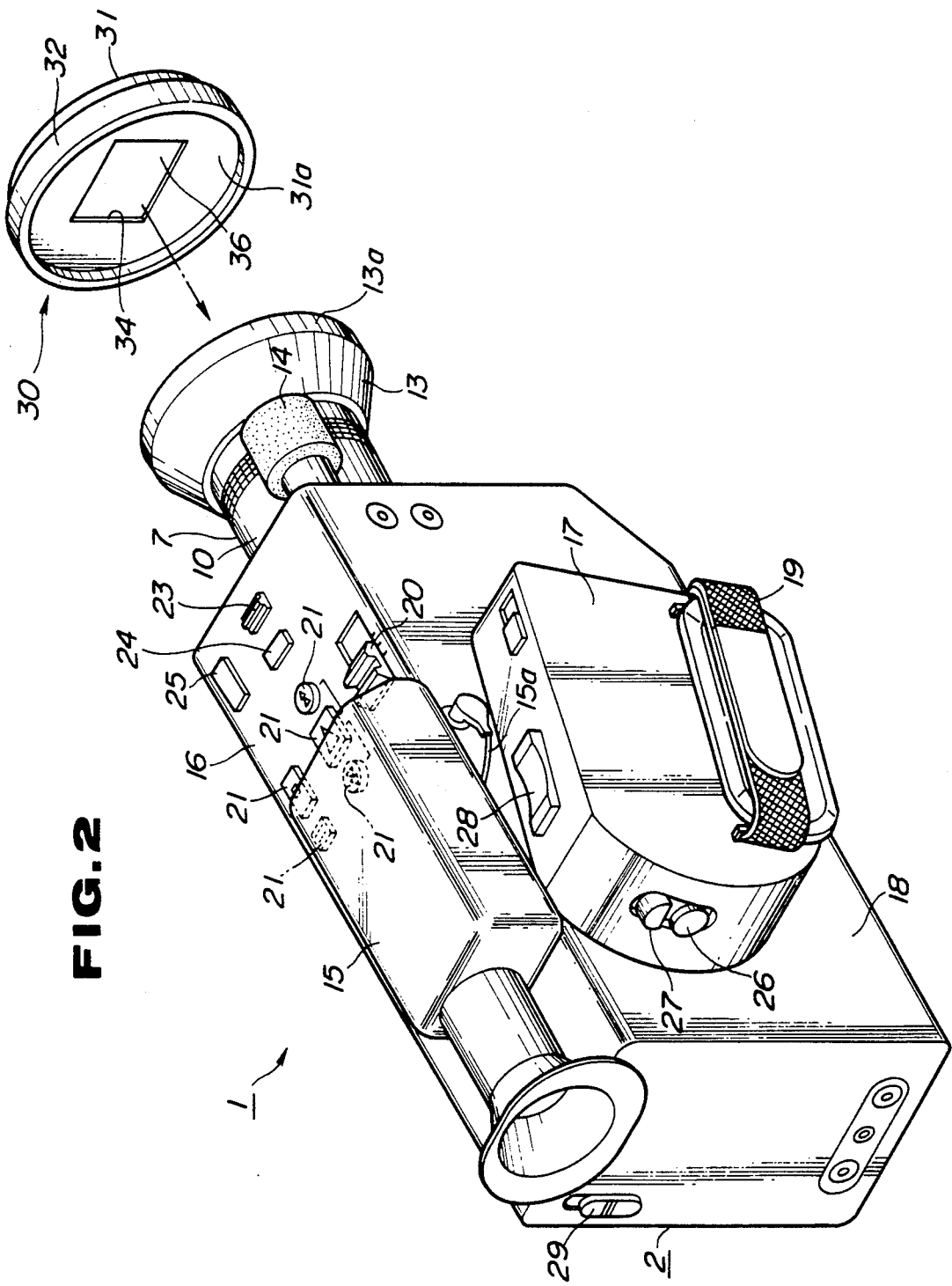
FIG. 2 is an enlarged perspective view of the video camera and lens cap shown in FIG. 1.

As shown in FIGS. 1 and 2, the video camera generally denoted by 1 includes a frame 2 on a rear part of a left side surface 3 (not shown in FIG. 2) which is formed with a cassette opening 4 for removing or inserting a cassette from or into the camera frame 2. A lid 5 is pivotally supported to open or close the cassette opening 4. A cassette holder (not shown) in which the tape cassette 6 is removably mounted beneath the inner surface of the lid 5 is provided. With the tape cassette 6 inserted in the cassette holder, the lid 5 is moved at the position at which the cassette opening 4 is closed so that the tape cassette 6 is mounted in a recording and playback portion in the frame 2.

A photograph lens 7 project 6 from a front surface 8 toward the forward direction. The photograph lens 7 includes a lens mirror envelope 7a in which a plurality of fixed and movable lenses are installed. A zooming ring 9 and a focussing ring 10 rotatably fitted to the outside of the lens mirror envelope 7a in a predetermined range for moving a predetermined one of the movable lenses in an optical axis direction when rotated. And operation knob 11 and lock release button 12 are provided on the zooming ring 9.

When the zooming ring 9 is rotated, the variator lens is moved so that a picture angle for the object being photographed by the photograph lens is changed and the focussing lens is moved and focussed together with the rotation of the focussing ring 10. When the lock release button 12 is pressed, the zooming ring 9 can be rotated within a given range in a further counterclockwise direction as viewed from the front surface of the video camera 1. When the zooming ring 9 is rotated within the above-described range, the photograph lens 7 functions as a macrolens capable of photographing an object at a close distance. Short photographing of the object up to about 6 milimeters can be carried out.

A lens hood 13 is removably threaded on a front end portion of the focussing ring 10.

It is noted that numeral 14 denotes a microphone, numeral 15 denotes an electronic view finder (EVF) supported on the rear part of the upper surface 16 of the frame 2, 15a denotes a connector for connecting the EVF 15 to a circuit installed in the frame 2, numeral 17 denotes a battery mounting portion projected from a right side surface 18 of the frame 2, and numeral 19 denotes a grip belt.

A mode selection button 20 is installed on an upper surface 16 of the frame 2 having three positions, i.e., a first position in which the function mode is in a camera mode, a second position in a playback mode, and a third position in an off mode in which neither the camera mode nor the playback mode function is carried out.

Numerals 21 . . . 21 — denote operation buttons operable in the playback mode of the video camera, e.g., a playback button, a tape forward button, tape rewind button, a stop button, and a pause button.

Numerals 22 . . . 22 —denote operation buttons operable during the photographing mode, e.g., an auto/-manual switching button for a white balance adjustment, an auto/manual switching button for a focussing, focussing botton, and an inverse light correction button.

Numerals 23, 24, and 25 denote operation buttons operating the photographing and storing the title, wherein the numeral 23 denotes a read button for reading the title, the numeral 24 denotes a color selection button for selecting the color of the title, and the numeral 25 denotes an on/off button for storing the read title or for outputting the title stored in the memory to an image recording circuit.

The numeral 26 denotes a photographing button disposed on the rear end portion of the battery mounting portion 17. Photographing by means of the video camera 1 is started by pressing the photographing button 26.

Numeral 27 denotes a stand-by button moved between a non-stand-by position and stand-by position. The non-stand-by position is placed at an immediately upper position of the photograph button 26 and the stand-by position is placed at a remote upper position of the photograph button 26. In the stand-by position, the video camera can photograph or can read the title.

The numeral 28 denotes an electric-powered zoom button and numeral 29 denotes a cassette removal button.

When the mode selection button 20 is moved to the photograph mode selection position and the stand-by button 27 is moved to the stand-by position, the video camera 1 is in the camera mode in which the image on the object captured by the camera lens 7 is displayed on the screen of the EVF (Electronic View Finder) 15.

When the photographing button 26 is depressed, an image captured by means of the photograph lens 7 and voice captured by the microphone 14 are recorded on the record playback portion (not shown) on a magnetic tape of the tape cassette 6.

The zooming during the photographing is carried out in response to the operation of the electric-powered zooming button 28 or in response to a manual rotation of the zooming ring 9. The focussing is automatically or manually carried out.

In addition, the photographing of the object at a close distance is carried out with the lock release button 12 depressed to enable the zooming lens 9 to rotate within a range macrofocus.

In a case where the lens hood 13 disturbs the photographing of the object at a close distance, the lens hood 13 may be removed.

The title is stored as follows.

With the stand-by button 27 moved to a stand-by position and the photograph lens 7 directed to the title recording paper, the photograph lens 7 is focused with the operator viewing the image displayed on the EVF 15. At this time, a read button 23 is depressed so that the image of the titled element is converted into an electrical signal and temporarily stored into a memory installed in a record/playback circuit of the video camera 1.

Next, when the color selection botton 24 is depressed, special abbreviated letters respectively meaning a plurality of prepared colors are displayed on the screen of the EVF 15. Whenever the above-described button 24 is depressed, the display of the abbreviated letters is switched. At a time when a desired color representation is displayed, the on/off button 25 is depressed.

At this time, the signal indicative of the color selected and the signal indicative of the title temporarily stored in the memory are stored in a memory and the image displayed on the screen of the EVF 15 disappears.

The title thus stored is superposed on the image of the object to be photographed and recorded on the magnetic tape when the on/off button 25 is depressed with the photograph button 26 depressed to start the photographing.

The numeral 30 generally denotes a lens cap removably covering the photograph lens 7 of the video camera 1 via the lens hood 13 chiefly for protecting the photograph lens 7.

The lens cap 30 includes a main part 31 in a disc shape having a diameter slightly larger than that of a leading end 13a of the lens hood 13 and a fitting portion 32 in a circular ring shape projected from an outer peripheral edge of the main part 31 toward an external position, i.e., the video camera 1 as shown in FIG. 2, both parts 31 and 32 being integrally formed of a synthetic resin.

A substantially rectangular space 33 is formed at a substantially center portion of the main part 31 in a thickness direction of the main part 31 as viewed from a thickness direction. In addition, windows 34 and 35 are formed between an inner surface 31a ( a surface at the side of the video camera 1) and a space 33 and the outer surface 31b, having a rectangular shape about one half smaller than the space 33.

Numerals 36 and 37 denote light transmissible screens formed of transparent or semitransparent synthetic resins such as those in milk white. These light transmissible screens 36 and 37 have thicknesses substantially one-third the width of the space 33, respectively, i.e., a dimension thereof along the thickness direction of the main part 31. Projections 37a, 37a are formed at side edge portions extended along the longitudinal direction of the front side light transmissible screen 37.

The light transmissible screens 36 and 37 are opposed to each other in their thickness directions and are housed and supported within the space 33 with an opposing gap held by means of the projections 37a, 37a.

Hence, a narrow rectangular space 38 which is substantially twice larger than the windows 34 and 35 (hereinafter referred to as a title inserting portion) is formed between two sheets of the light transmissible screens 36 and 37.

The numeral 39 denotes an introducing slit formed between one end of the title inserting portion 38 in the longitudinal direction and the outer peripheral surface of the main part 31. The one light transmissible screen 36 is transparent and the other light transmissible screen 37 is transparent or semitransparent.

The lens cap 30 thus formed assist the photographing of the title in addition to protecting the photograph lens 7.

That is to say, the lens cap 30, as shown in FIG. 1, has its fitting portion 32 fitted to the outside of the leading end portion 13a of the lens hood 13 of the video camera 1 so as to enclose the photograph lens 7 via the lens hood 13. Thus, the photographing 7 can be protected.

In addition, the title recording paper is attached to the lens hood 13 with the paper inserted in the title inserting portion 38. At this time, the title photographing can extremely easily be carried out.

That is to say, the numeral 40 denotes the title recording paper made of a transparent or semitransparent paper or film of a synthetic resin. The recording paper 40 has substantially the same width as that of the title inserting portion 38 and is substantially rectangular having a length substantially 1.5 times the length of the title inserting portion 38. As shown in FIG. 4, a frame 40a having a size substantially the same as each window 34 and 35 is provided at a part offset toward one end in the longitudinal direction. An arbitrary title element is described in the frame 40a.

Figure 3:
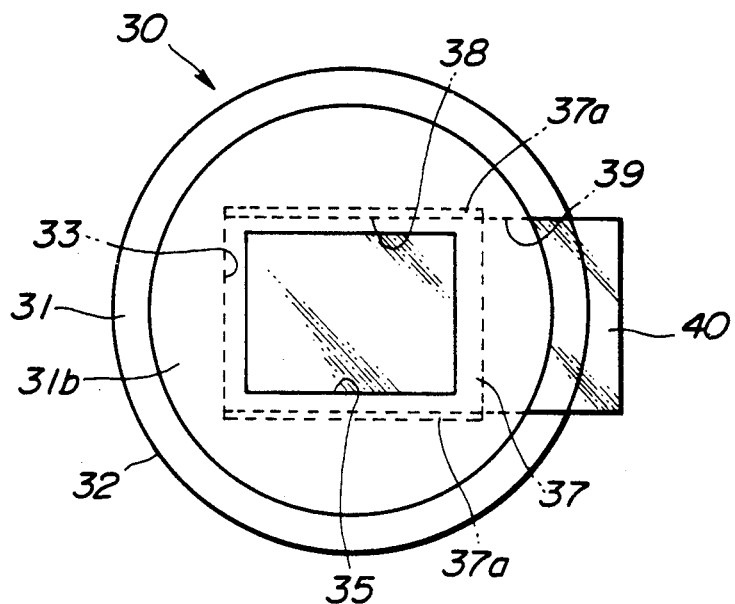
FIG. 3 is an enlarged front view of the lens cap representing a title recording paper is supported.

The arbitrary title element is described by means of an ink relatively thick in color within the frame 40a of the title recording paper 40. The title recording paper 40 is inserted into the title inserting portion 38 of the lens cap 40 through the introducing slit 39 as shown in FIG. 3. At this time, with the lens cap 30 attached onto the lens hood 13 and the stand-by button 27 placed at the stand-by position, the photograph lens 7 traps the title element described on the title recording paper 40 and its image is displayed on the screen of the EVF 15.

The focussing of the lens to the object, i.e., the title recording paper 40 is carried out by the turn of the zooming ring 9 within the adjustment range during the macrophotograph.

If the read button 23 is depressed, the title element described on the title recording paper 40 is temporarily stored in the memory. Therefore, when, as described above, upon completion of the color selection through the color selection button 24, the on/off switch 25 is depressed, the title element into the memory. It is noted that it is possible to describe the title element directly through an aqueous pen on the inner light transmissible screen 36 without use of the title recording paper 40.

SECOND PREFERRED EMBODIMENT

FIGS. 5 to 7 show a second preferred embodiment of the lens cap according to the present invention.

In the second preferred embodiment, the lens cap generally denoted by 41 includes a cap main body 42 formed of a semitransparent synthetic resin and a paper press 43 made of a transparent synthetic resin pivotally supported on the cap main body 42.

The numeral 44 denotes the main part of the cap main body 42 formed in a disc shape having a diameter slightly larger than the diameter of the leading end portion 13a of the lens hood 13 and whose fitting portion 45 of the circular ring shape at the outer peripheral edge portion of the main body 40 is integrally projected in the direction to the video camera 1.

Four positioning projections 46a, 46b, 46c, and 46d, two supporting projections 47 and 47, and a supporting projection 48 are extended at the inner surface 44a of the main part 44. Two 46a and 46b of the four positioning projections 46a, 46b, 46c and 46d are installed at positions near both ends of the center part of the main body 44. The other two positioning projections 46c and 46d are disposed and left and right spaced apart from each other with respect to and at the position near the lower part of the main body 44. The two supporting projections 47 and 47 are disposed so as to be left and right spaced apart from each other at a further lower position of the positioning projections 46c and 46d and the engagement projection 48 is disposed at an upper center position of the main body 44. It is noted that the leading end of the engagement projection 48 is formed with an engagement portion 48a projected toward the supporting projections 47 and 47.

A paper press 43 includes a press plate 49 of a substantially square shape slightly smaller than another square inscribing an inner peripheral surface of the fitting portion 45 of the cap main body 42 and a projecting piece 50 projected downward from a center portion of the lower edge of the press plate 49, both plate 49 and projecting piece 50 being integrally formed. A thin hinge portion 51 is formed at a position adjacent to the press plate 49 of the projecting piece 50. Mounting holes 52, 52 (only one of which is shown in FIG. 7) are formed at both left and right ends of a position along a lower edge of the projecting piece 50.

Supporting projections 47 and 47 extended from the cap main body 42 are inserted through mounting holes 52 and 52 of the paper press 43 and parts of projections from the mounting holes 52 and 52 are fixed to the inner surface 44a of the main part 44 of the cap main body 42 by means of a hot staking or cold staking.

Hence, the paper press 43 is supported on the cap main body 42 in a state in which the press plate 49 can be contacted with or separated from the inner surface 44a of the main part 44 of the main body 42, with a hinge portion 51 of the paper press 43 being a pivoting fulcrum.

It is noted that when a position of the press plate 49 of the paper press 43 at which the press plate 49 is overlapped over the main part 44 of the cap main body 42 (hereinafter referred to as a paper press position), positioning projections 46, 46 . . . - - - are inserted into positioning holes 53, 53, - - - so that the press plate 49 can be positioned. The positioning holes 53, - - - are formed at positions which have larger diameters than the positioning projections 46a, 46b, 46c, and 46d individually facing toward the projections 46a, 46b, 46c, and 46d.

When the press plate 49 is placed and positioned at the paper press position, its pivoting end edge is engaged with an engage position 48a of the engagement projection 48 of the main body 42.

The numeral 54 denotes a title recording paper made of the same material as the title recording paper 40 shown in the first preferred embodiment. The title recording paper 54 is formed in a rectangular shape substantially smaller than the press plate 49 of the paper press 43.

To hold the title recording paper 54 on the lens cap 41, the press plate 49 of the paper press 43 is pivoted so that the press plate 49 of the paper press 43 is separated from the main part 44 of the cap main body 42 to some degree. The title recording paper 54 is placed within a region 55 enclosed with the positioning projections 46, 46, - - - and engagement projection 48. Next, the paper press 49 is moved to the paper press position.

Thus, the lens cap 41 is held with the title recording paper 54 sandwiched between the main part 44 of the cap main body 42 and the press plate 49 of the paper press 43.

If, with the press plate 49 placed at the paper press position and spaced apart from the main part 44, a tip portion of the engagement projection 48 installed on the main part 44 is forced to flex in the upward direction, the edge of the pivoting end of the press plate 49 may be grasped by a finger tip and pulled toward the operator.

In the second preferred embodiment, the aqueous pen or the like can be used to describe directly the title element on the region 55 provided on the main part 44 or on a position of the press plate 55 corresponding to the region 55 without use of the title recording paper 54.

THIRD PREFERRED EMBODIMENT

FIGS. 8 to 10 show a third preferred embodiment of the lens cap according to the present invention.

The lens cap 56 includes the cap main body 57 formed to a transparent or semitransparent synthetic resin and a paper press 58 removable attached to the cap main body 57.

For respective parts of the cap main body 57 and the paper press 58 having the same structures or same functions as the main body 42 of the lens cap 41 shown in the second preferred embodiment, their explanations are omitted since the same reference numerals as those used in the second preferred embodiment are assigned and their explanation are omitted here.

Numerals 59, 59 . . . - - - denote four engagement projections substantially in a semispherical shape formed symmetrically on the inner surface of the fitting portion 45 of the cap main body 57 with respect to a center of the cap main body 57 with respect to a center of the cap main part 44.

The paper press 58, on the other hand, is formed in a disc shape having a dimension capable of tightly fitting into the fitting portion 45 of the cap main body 57.

Hence, when the paper press 58 is fitted into the inner surface 44a of the main body 44 of the cap main body 57 so as to be laid over the inner surface 44a of the main part 44 of the cap main body, the engagement projections 59, 59 . . . - - - formed on the cap main body 57 are engaged on the outer peripheral edge of the fitting portion 45. Consequently, the paper press 58 is grasped on the cap main body 57.

A hole 60 is formed through an upper end of the main part 44.

When the paper press 58 is attached to the cap main body 57 with the title recording paper 54 placed on a region 61 enclosed with the positioning projections 46a, 46b, 46c, and 46d of the main part 44 of the cap main body 57, the title recording paper 54 is held on the lens cap 56 with the title recording paper 54 being supported between the cap main body 57 and the paper press 58.

To remove the title recording paper 54 from the lens cap 56, a finger tip of the operator is inserted from the front surface side into the hole 60 formed on the upper end of the main part 44 of the cap main body 57 to depress the upper end of the paper press 58. At this time, the paper press 58 is disengaged from the engagement projections 59, 59 . . . - - - at its peripheral edge. Therefore, the paper press 59 can be removed from the cap main body 57 and subsequently the title recording paper 54 can be removed from the cap main body 57.

It is noted that in the third preferred embodiment the aqueous pen can be used to directly inscribe the region 61 of the main part 44 of the cap main body 57 or position corresponding to the region 61 of the paper press 58.

As described hereinabove, the lens cap according to the present invention is a lens cap removably attachable to the tip portion of the photograph lens capable of photographing a object at a close distance and in which a region into which the title element can removable be attached is provided.

Therefore, photographing of the arbitrary title can extremely easily be carried out.

In addition, since the lens cap in which the arbitrary title element is provided on the related region is attached to the photograph lens, photographing of the title element can be carried out. The title photographing can be carried out without hanging the title recording paper on the wall or without holding the title recording paper on the larger sized holding instrument. In addition, since the title photographing is carried out with the positional relationship between the title element and photograph lens fixed, the title photographing can be carried out without occurrence of camera vibrations.

The lens according to the present invention can be used to photograph a title without use of the special auxiliary instrument; without selection of photographing location, and without generation of such vibrations as described above.

In each preferred embodiment, the title arranged region is a structure in which the title recording paper is held between two plate-like members having light transmittance. However, the title arranged region is not limited to those in the respective preferred embodiments.

The is to say, the title arranged region of the lens cap according to the present invention is an arbitrary structure if the arbitary title element is removable installed. For example, the title region can be arranged such that a plurality of engagement portions are installed so as to enable the engageable and disengageable insertion of the side edge portion and side corner portion of the title recording paper in the region, these engagement portions suspending the title recording paper. Alternatively, at least part of the cap which faces against the lens is transparent or semi-transparent and is formed of a material to which a predetermined ink can be applied and which can easily be wiped out. In this case, the predetermined ink pen can be used to describe directly the title element on the related region.

The present invention is applicable to the lens cap attachable to the photograph lens via the, lens hood. However, the present invention is also applicable to the lens cap removable attachable to the tip portion of the photograph lens without the lens hood. The present invention is also applicable to the lens cap for various types of the photograph lens of cameras.

What is claimed is:

1. A lens cap for a photograph lens of a camera comprising:
   (a) a photograph lens;
   (b) a lens cap body having means for removably covering a tip portion of the photograph lens capable of photographing an object at a closer distance than a normal photographing;
   (c) means for removably attaching the lens cap to the photograph lens, said attaching means extending from said lens cap body in a direction; and
   (d) a title element made from a light transmitting material and carrying indicia, said lens cap defining a light transmission path from said indicia in said first direction, whereby said indicia is visible to the photograph lens of the camera, said title element being removably installed at a region of the lens cap body and photographable by such photograph lens; and
   (e) means including a press plate made of a light transmitting material for removably installing said light transmitting title element at said region of said lens cap body.

2. A lens cap comprising:
   (a) a lens cap body having means for removably covering a tip portion of a photograph lens capable of photographing an object at a closer distance than a normal photographing;
   (b) a title element made from a transparent material;
   (c) means on said lens cap body defining a region of the lens cap body on which region the title element is removably installed and is photographable by such photograph lens; and
   (d) means including a press plate made of a light transmitting material for holding said transparent title element on said region of the lens cap body, said press plate permitting said title element to be removably installed thereat.

3. The lens cap as set forth in claim 1, wherein the title element is made of a material in white.

4. A lens cap comprising:
   (a) a lens cap body having means for removably covering a tip portion of a photograph lens capable of photographing an object at a closer distance than a normal photographing;
   (b) a title element made of a transparent material; and
   (c) means on said lens cap body defining a region of the lens cap body on which region the title element is removably installed and is photographable by such photograph lens.

5. The lens cap as set forth in claim 4 wherein the title element is made of a light transmitting material.

6. The lens cap as set forth in claim 4 wherein the title element is made of a transparent material.

7. The lens cap as set forth in claim 3, wherein the title recording paper has a dimension smaller than the lens cap body so as to fit to the lens cap body, the lens cap body including at least one projection engageable with a hole penetrated through the title recording member.

8. A device for a title applicable to a video camera, comprising:
   (a) a video camera having a photograph lens;
   (b) cap means for removably covering a tip portion of the photograph lens of the video camera which is capable of photographing an object in a macro mode;
   (c) means for removably attaching the lens cap to the camera, said attaching means extending from said lens cap body in a first direction;
   (d) a title element carrying indicia, said cap defining a light transmission path from said indicia in said first direction, whereby said indicia is visible to the lens of the camera; and
   (e) holding means for supporting the title element on the cap means that the title element supported on the cap means can be photographed by the video camera through the photograph lens.

9. A device for a title applicable to a video camera, comprising:
   (a) a video camera having a photograph lens;
   (b) cap means for removably covering a tip portion of the photograph lens of the video camera which is capable of photographing an object in a macro mode;

(c) means for removably attaching the lens cap to the camera, said attaching means extending from said lens cap body in a first direction;

(d) a light-transmitting title element carrying indicia, said cap defining a light transmission path through said title element from said indicia in said first direction, whereby said indicia is visible to the lens of the camera; and (e) holding means for supporting the title element on the cap means so that the title element supported on the cap means can be photographed by the video camera through the photograph lens, said holding means including a pressing means made from a light transmitting material for pressing the title element on an inner surface of said cap means visible to the lens of the camera.

10. A lens cap for the lens of a camera comprising:
(a) a lens cap body;
(b) means for removably attaching the lens cap to the camera, said attaching means extending from said lens cap body in a first direction; and
(c) a title element carrying indicia, said cap defining a light transmission path from said indicia in said first direction, whereby said indicia is visible to the lens of the camera.

11. A lens cap for the lens of a camera comprising:
(a) a lens cap body;
(b) means for removably attaching the lens cap to the cameral, said attaching means extending from said lens cap body in a first direction;
(c) a title element carrying indicia, said cap defining a light transmission path from said indicia in said first direction, whereby said indicia is visible to the lens of the camera, and
(d) means for pressing the title element on a surface of the cap, said pressing means including a press plate made from a light transmitting material.

12. The lens cap as set forth in claim 10, wherein the title element comprises a title recording member made of at least one of transparent or semitransparent material of synthetic resin, the title recording member having a dimension smaller than the lens cap body so as to fit to the lens cap body, the lens cap body including at least one projection engageable with a hole penetrated through the title recording member.

13. The lens cap as set forth in claim 12, wherein the lens cap body includes a hole for removing the fitted title recording member.

14. The device as set forth in claim 10, wherein the title element includes means for slidably inserting frame defined by a surface of the cap means.

15. The device as set forth in claim 10, wherein the title element includes means for pressing the title element on a surface of the cap.

16. The device as set forth in claim 10, wherein the title element includes a plurality of positioning members installed on the cap and title element for hanging and positioning the title element on a surface of the cap means facing the photograph lens.

17. The lens cap according to claim 10, further comprising means for removably supporting the title element.

18. A lens cap comprising:
(a) a lens cap body capable of removably covering a top portion of a photograph lens which is capable of photographing an object at a closer distance than a normal photographing;
(b) a title element;
(c) a region of the lens cap body on which the title element is removably installed; and
a press plate made of a light transmitting material and wherein the title element comprises a title recording paper made of at least one of a transparent or semitransparent material of synthetic resin, the title element being held on the lens cap main body by means of the press plate.

19. A device for displaying a title to a video camera having a lens, comprising:
means for removably covering the lens of the video camera, said lens covering means comprising a removable and exchangeable title element carrying a title, and
means for supporting said removable and exchangeable title element such that the title is in the photograph view of said lens.

20. The device according to claim 19, wherein said title element supporting means comprises means for removably supporting said title element on said covering means.

* * * * *

UNITED STATES PATENT AND TRADEMARK OFFICE
CERTIFICATE OF CORRECTION

PATENT NO. : 5,162,942

DATED : November 10, 1992

INVENTOR(S) : TSUTOMU ANZAI and AKIRA ISOBE

Page 1 of 5

It is certified that error appears in the above-identified patent and that said Letters Patent is hereby corrected as shown below: Begining at col. 9, lines 51-68 thru col. 10, lines 1-68, and col. 11, lines 1-45 thru col. 12, lines 1-3.

Claims 1 to 20 should be deleted and the following claims 1 to 13 substituted therefor:

1. A lens cap for a photograph lens of a camera comprising:
   (a) a photograph lens;
   (b) a lens cap body having means for removably covering a tip portion of the photograph lens capable of photographing an object at a closer distance than a normal photographing;
   (c) means for removably attaching the lens cap to the photograph lens, said attaching means extending from said lens cap body in a first direction;

(d) a title element made from a light transmitting material and carrying indicia, said lens cap defining a light transmission path from said indicia in said first direction, whereby said indicia is visible to the photograph lens of the camera, said title element being removably installed at a region of the lens cap body and photographable by such photograph lens; and
   (e) means including a press plate made of a light transmitting material for removably installing said light transmitting title element at said region of said lens cap body.

2. A lens cap comprising:
   (a) a lens cap body having means for removably covering a tip portion of a photograph lens

UNITED STATES PATENT AND TRADEMARK OFFICE
CERTIFICATE OF CORRECTION

PATENT NO. : 5,162,942

DATED : November 10, 1992

INVENTOR(S) : TSUTOMU ANZAI and AKIRA ISOBE

It is certified that error appears in the above-identified patent and that said Letters Patent is hereby corrected as shown below:

capable of photographing an object at a closer distance than a normal photographing;
    (b) a title element made from a transparent material;
    (c) means on said lens cap body defining a region of the lens cap body on which region the title element is removably installed and is photographable by such photograph lens; and
    (d) means including a press plate made of a light transmitting material for holding said transparent title element on said region of the lens cap body, said press plate permitting said title element to be removably installed thereat.

3. A lens cap comprising:
    (a) a lens cap body capable of removably covering a top portion of a photograph lens which is capable of photographing an object at a closer distance than a normal photographing;
    (b) a title element;
    (c) a region of the lens cap body on which the title element is removably installed; and
    (d) a press plate made of a light transmitting material and wherein the title element comprises a title recording paper made of at least one of a transparent or semitransparent material of synthetic resin, the title element being held on the lens cap main body by means of the press plate.

UNITED STATES PATENT AND TRADEMARK OFFICE
CERTIFICATE OF CORRECTION

PATENT NO. : 5,162,942

DATED : November 10, 1992

INVENTOR(S) : TSUTOMU ANZAI and AKIRA ISOBE

It is certified that error appears in the above-indentified patent and that said Letters Patent is hereby corrected as shown below:

```
     4.   The lens cap as set forth in claim 3, wherein the
title element is made of a light transmitting material.

5.   The lens cap as set forth in claim 3, wherein the
title element is made of a transparent material.

6.   The lens cap as set forth in claim 3, wherein the
title element is made of a material in white.

7.   The lens cap as set forth in claim 3, wherein the
title recording paper has a dimension smaller than the lens
cap body so as to fit to the lens cap body, the lens cap
body including at least one projection engagable with a hole
pentrated through the title recording member.

8.   The lens cap as set forth in claim 7, wherein the
lens cap body includes a hole for removing the fitted title
recording member.

9.   A device for a title applicable to a video camera,
comprising:
     (a)  a video camera having a photograph lens:
     (b)  cap means for removably covering a tip
portion of the photograph lens of the video camera
which is capable of photographing an object in a
macro mode;
```

UNITED STATES PATENT AND TRADEMARK OFFICE
CERTIFICATE OF CORRECTION

PATENT NO. : 5,162,942
DATED : November 10, 1992
INVENTOR(S) : TSUTOMU ANZAI and AKIRA ISOBE It is certified that error appears in the above-identified patent and that said Letters Patent is hereby corrected as shown below:

(c) means for removably attaching the lens cap to the camera, said attaching means extending from said lens cap body in a first direction;
      (d) a light-transmitting title element carrying indicia, said cap defining a light transmission path through said title element from said indicia in said first direction, whereby said indicia is visible to the lens of the camera; and
      (e) holding means for supporting the title element on the cap means so that the title element supported on the cap means can be photographed by the video camera through the photograph lens, said holding means including a pressing means made from a light transmitting material for pressing the title element on an inner surface of said cap means visible to the lens of the camera.

10. The device as set forth in claim 9, wherein the photograph lens is a zoom lens.

11. A lens cap for the lens of a camera comprising:
      (a) a lens cap body:
      (b) means for removably attaching the lens cap to the camera, said attaching means extending from said lens cap body in a first direction:
      (c) a title element carrying indicia, said cap defining a light transmission path from said indicia in said first direction, whereby said indicia is visible to the lens of the camera, and

UNITED STATES PATENT AND TRADEMARK OFFICE
CERTIFICATE OF CORRECTION

PATENT NO. : 5,162,942
DATED : November 10, 1992
INVENTOR(S) : TSUTOMU ANZAI and AKIRA ISOBE It is certified that error appears in the above-indentified patent and that said Letters Patent is hereby corrected as shown below:

(d) means for pressing the title element on a surface of the cap, said pressing means including a press plate made from a light transmitting material.

12. The lens cap according to claim 11, further comprising means for removably supporting the title element.

13. The device as set forth in claim 11, wherein the title element includes a plurality of positioning members installed on the cap and title element for hanging and positioning the title element of a surface of the cap means facing the photograph lens.

Signed and Sealed this

Twenty-sixth Day of April, 1994

Attest:

BRUCE LEHMAN

Attesting Officer    Commissioner of Patents and Trademarks